(12) United States Patent
Morita et al.

(10) Patent No.: US 10,971,741 B2
(45) Date of Patent: Apr. 6, 2021

(54) FUEL CELL SYSTEM

(71) Applicant: Panasonic Intellectual Property Management Co., Ltd., Osaka (JP)

(72) Inventors: Junji Morita, Kyoto (JP); Takehiko Ise, Osaka (JP); Yoshito Usuki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 37 days.

(21) Appl. No.: 16/384,995

(22) Filed: Apr. 16, 2019

(65) Prior Publication Data

US 2019/0363383 A1 Nov. 28, 2019

(30) Foreign Application Priority Data

May 23, 2018 (JP) .............................. JP2018-098949

(51) Int. Cl.
| | |
|---|---|
| *H01M 8/04* | (2016.01) |
| *H01M 8/04223* | (2016.01) |
| *H01M 8/04089* | (2016.01) |
| *H01M 8/04746* | (2016.01) |

(52) U.S. Cl.
CPC ... *H01M 8/04231* (2013.01); *H01M 8/04097* (2013.01); *H01M 8/04761* (2013.01)

(58) Field of Classification Search
CPC ......... H01M 8/04097; H01M 8/04231; H01M 8/04761
See application file for complete search history.

(56) References Cited

U.S. PATENT DOCUMENTS

2008/0075992 A1* 3/2008 Fujita ................ H01M 8/04302
429/434

FOREIGN PATENT DOCUMENTS

| JP | 2005-032652 | 2/2005 |
| JP | 2006-164736 | 6/2006 |

OTHER PUBLICATIONS

Extended European Search Report dated Oct. 29, 2019 for the related European Patent Application No. 19166984.5.

* cited by examiner

*Primary Examiner* — Osei K Amponsah
(74) *Attorney, Agent, or Firm* — McDermott Will & Emery LLP

(57) ABSTRACT

A fuel cell system includes: a fuel cell; a fuel gas supply path supplying the fuel gas to the fuel cell; a recycling path returning discharged anode off-gas to an entrance of the fuel cell; an anode off-gas discharge path branching from the recycling path and discharging the anode off-gas to an outside; a first valve in the anode off-gas discharge path; a pressurizer pressurizing the anode off-gas; and a controller performing control to cause the pressurizer to act in at least one of a timing in execution of a purge action supplying the fuel gas from the fuel gas supply path and discharging the anode off-gas to the outside in a first valve open state and a timing in prescribed time after the purge action and assessing abnormality based on a pressure of the recycling path or anode off-gas discharge path or an action amount of the pressurizer.

6 Claims, 12 Drawing Sheets

FUEL CELL SYSTEM

BACKGROUND

1. Technical Field

The present disclosure relates to a fuel cell system.

2. Description of the Related Art

A polymer electrolyte fuel cell that uses a polymer electrolyte membrane as an electrolyte generates power by causing hydrogen in fuel gas supplied to an anode through a fuel gas supply path to electrochemically react with oxygen in air supplied to a cathode. For a fuel cell system that includes such a fuel cell, in order to improve power generation efficiency, a method has been suggested in which anode off-gas which includes unreacted hydrogen and is discharged from the anode is pressurized by using a pressurizer and is again circulated and supplied to the anode and the supply amount of hydrogen is reduced.

In a case of such a fuel cell system, when abnormality occurs in a circulation path (recycling path) and a supply path of the fuel gas, the supply amount of the fuel gas supplied to the anode of the fuel cell becomes insufficient, and this leads to lowering of the power generation efficiency and degradation of the fuel cell.

Accordingly, a fuel cell system has been suggested which may diagnose abnormality of a pressurizer (fuel circulation pump) in a recycling path (for example, see Japanese Unexamined Patent Application Publication No. 2005-32652). Specifically, Japanese Unexamined Patent Application Publication No. 2005-32652 suggests a configuration which performs an assessment about whether or not the pressurizer is abnormal by any of the following (a) to (c).
(a) Assess whether or not the rotational speed of the pressurizer is a desired rotational speed.
(b) Assess whether or not the pressure difference in the hydrogen pressure between an entrance and an exit of the pressurizer is a desired value.
(c) Assess whether or not the hydrogen pressure of the exit of the pressurizer is a desired value.

SUMMARY

Related art (Japanese Unexamined Patent Application Publication No. 2005-32652) has room for improvement in assessment of abnormality of a pressurizer.

One non-limiting and exemplary embodiment provides a fuel cell system that may more precisely assess abnormality of a pressurizer than related art.

In one general aspect, the techniques disclosed here feature a fuel cell system including: a fuel cell that generates power by using a fuel gas and an oxidant gas; a fuel gas supply path that supplies the fuel gas to an anode entrance of the fuel cell; a recycling path that returns anode off-gas which is discharged from an anode exit of the fuel cell to an entrance of the fuel cell; an anode off-gas discharge path that branches from the recycling path and discharges the anode off-gas to an outside; a first valve that is provided in the anode off-gas discharge path; a pressurizer that is provided in the recycling path and pressurizes the anode off-gas which flows through the recycling path; and a controller that controls the pressurizer to act in at least one of a timing in execution of a purge action in which the fuel gas is supplied from the fuel gas supply path and the anode off-gas is discharged to the outside in a state where the first valve is opened and a timing in prescribed time after the purge action and that assesses abnormality based on a pressure of the recycling path or of the anode off-gas discharge path in the control or an action amount of the pressurizer.

The present disclosure is configured as described above and provides an effect of more precisely assessing abnormality of a pressurizer than related art.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
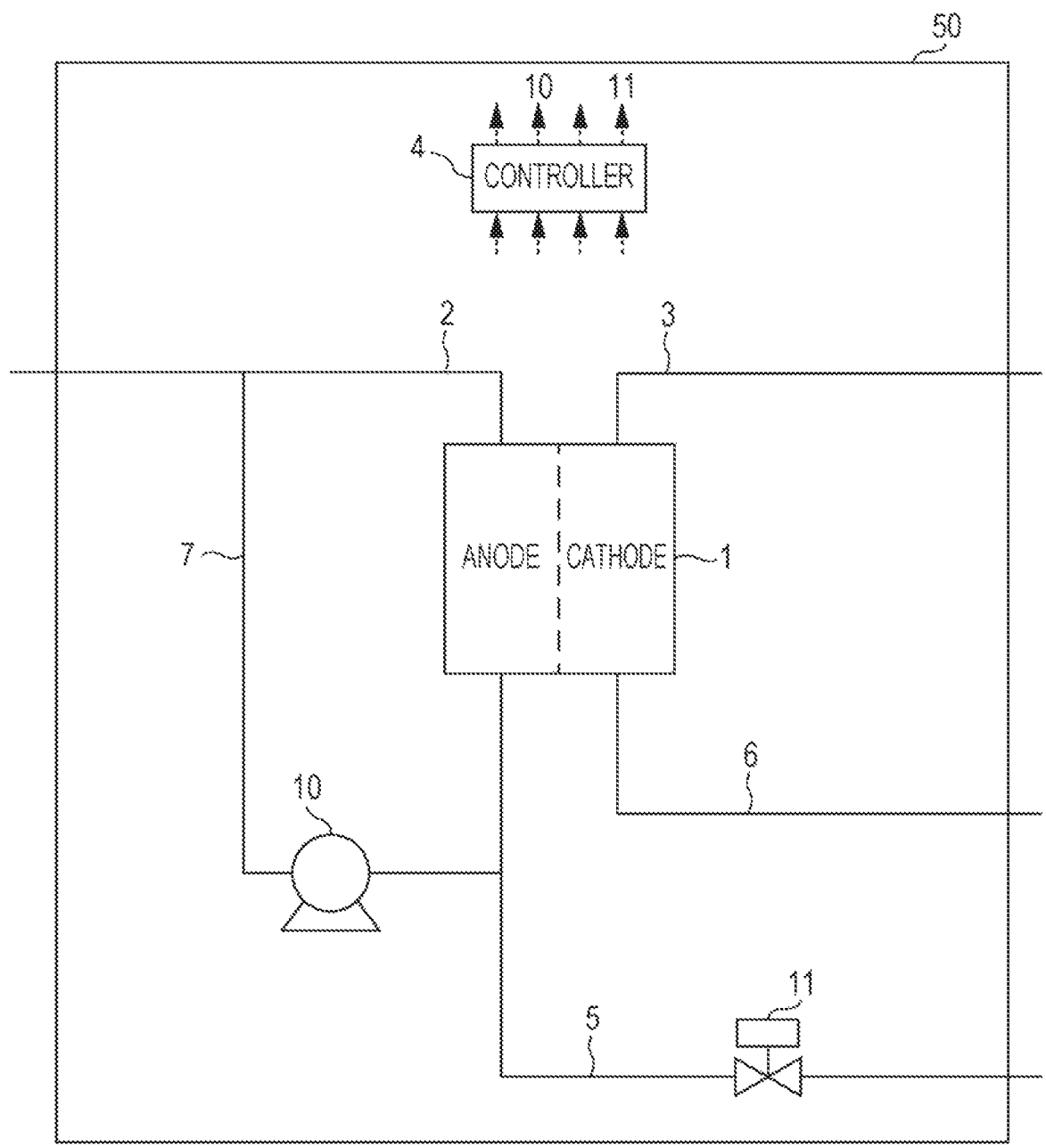
FIG. 1 is a diagram that schematically illustrates one example of a configuration of principal components of a fuel cell system according to a first embodiment of the present disclosure.

DETAILED DESCRIPTION (Underlying Knowledge Forming Basis of the Present Disclosure)

The present inventors have conducted intensive studies about abnormality detection in a pressurizer in a fuel cell system that includes a recycling path, pressurizes anode off-gas by a pressurizer, and circulates and supplies the anode off-gas to an anode of a fuel cell via the recycling path. As a result, the present inventors have found that related art has the following problems.

That is, for a fuel cell system described in Japanese Unexamined Patent Application Publication No. 2005-32652, an assessment method about abnormalities of a pressurizer indicated by the above-described (a) to (c) has been suggested. However, the present inventors have found that Japanese Unexamined Patent Application Publication No. 2005-32652 does not take into consideration an operation condition of the fuel cell system in assessment of abnormality of the pressurizer and it is thus difficult to precisely assess abnormality of the pressurizer. In other words, in a case of a closed circuit operation in which the anode off-gas is circulated and supplied to a stack of the fuel cell through the recycling path, non-reactive components in the atmosphere (mainly nitrogen) are accumulated in the anode off-gas, and the composition of the fuel gas thereby changes. Thus, for example, as Japanese Unexamined Patent Application Publication No. 2005-32652, in a case of a configuration in which hydrogen pressures of an entrance and an exit of the pressurizer or a hydrogen pressure of the exit of the pressurizer is detected and abnormality of the pressurizer is thereby assessed, the detection result may be different depending on the operation condition of the fuel cell in performance of detection. Thus, the present inventors have found that it is difficult for the techniques of Japanese Unexamined Patent Application Publication No. 2005-32652 to precisely assess whether or not the pressurizer is abnormal.

Accordingly, the present inventors have found that abnormality of the pressurizer is assessed in an operation condition in which the composition of the anode off-gas in the recycling path is fixed and an assessment about whether or not abnormality of the pressurizer is present may thereby be performed more precisely. Specifically, the present inventors have found that an assessment is made about abnormality of the pressurizer in an operation condition as either one of a timing in execution of a purge action, in which a fuel gas is supplied from a fuel gas supply path and the anode off-gas is discharged to the outside in a state where a first valve (purge valve) provided in an anode off-gas discharge path is opened, and a timing in prescribed time after the purge action and that assessment about abnormality of the pressurizer may thereby precisely be performed.

The above knowledge of the present inventors was not discovered previously and has novel technical features that provide significant work and effect. Accordingly, the present disclosure provides aspects that will specifically be described in the following.

A fuel cell system according to a first aspect of the present disclosure includes: a fuel cell that generates power by using a fuel gas and an oxidant gas; a fuel gas supply path that supplies the fuel gas to an anode entrance of the fuel cell; a recycling path that returns anode off-gas which is discharged from an anode exit of the fuel cell to an entrance of the fuel cell; an anode off-gas discharge path that branches from the recycling path and discharges the anode off-gas to an outside; a first valve that is provided in the anode off-gas discharge path; a pressurizer that is provided in the recycling path and pressurizes the anode off-gas which flows through the recycling path; and a controller that controls the pressurizer to act in at least one of a timing in execution of a purge action in which the fuel gas is supplied from the fuel gas supply path and the anode off-gas is discharged to the outside in a state where the first valve is opened and a timing in prescribed time after the purge action and that assesses abnormality based on a pressure of the recycling path or of the anode off-gas discharge path in the control or an action amount of the pressurizer.

In the above configuration, the controller performs the control so as to cause the pressurizer to act in at least one of a timing in execution of the purge action in which the fuel gas is supplied from the fuel gas supply path and the anode off-gas is discharged to the outside in a state where the first valve is opened and a timing in the prescribed time after the purge action and assesses abnormality based on the pressure of the recycling path or of the anode off-gas discharge path in the control or the action amount of the pressurizer.

Incidentally, the magnitude of the pressure loss that occurs in the fuel cell depends on the composition of the fuel gas that flows through the fuel cell. Further, in a closed circuit operation in which the anode off-gas is repeatedly circulated in the fuel gas supply path in a state where the first valve is closed, nitrogen is gradually included in the anode off-gas, and the composition of the fuel gas thus changes.

However, in the above configuration, an abnormality assessment for the pressurizer is performed in the purge action in which the fuel gas is supplied from the fuel gas supply path and the anode off-gas is discharged to the outside in a state where the first valve is opened or in the prescribed time after the purge action. Thus, the abnormality assessment for the pressurizer may be performed while the composition of the fuel gas that flows through the fuel cell is fixed.

Note that at least one of the timing in execution of the purge action for discharging the anode off-gas to the outside and the timing in the prescribed time after the purge action may be either one of a timing in execution of the purge action for discharging the anode off-gas to the outside and a timing in the prescribed time after the purge action. Further, the timing may be both of a timing in execution of the purge action for discharging the anode off-gas to the outside and a timing in the prescribed time after the purge action.

Here, "the prescribed time after the purge action" is properly set as elapsed time after the purge action in which a fluctuation in the composition is small from the composition of the fuel gas in the recycling path or in the anode off-gas discharge path at the time when the purge action is finished and the precision of the abnormality assessment for the pressurizer becomes equivalent to the precision in the purge action.

Note that when the output of the pressurizer lowers due to failure, the flow amount of the anode off-gas that flows through the recycling path lowers. Thus, if the pressure of the fuel gas supplied to the fuel cell through the fuel gas supply path is regular, the pressure loss in the fuel cell lowers, and the pressure of the anode off-gas discharged from the anode exit of the fuel cell becomes high compared to a case where the pressurizer normally works. Thus, an assessment may be made about whether or not abnormality of the pressurizer is present from the pressure of the anode off-gas that flows through the recycling path or the anode off-gas discharge path.

Further, in order to assess abnormality of the pressurizer, the output (action amount) of the pressurizer may be monitored. Here, when abnormality occurs to the pressurizer, the output (action amount) with respect to a prescribed indicated value changes compared to a case where the pressurizer normally works. Thus, an assessment may be made about whether or not abnormality of the pressurizer is present from the change in the action amount of the pressurizer. For example, when the action amount of the pressurizer with respect to the prescribed indicated value is a first action amount threshold value or less or a second action amount threshold value or more, which is greater than the first action amount threshold value, an assessment is made that abnormality is present.

Thus, the fuel cell system according to the first aspect of the present disclosure provides an effect of more precisely assessing abnormality of the pressurizer than related art.

Further, as for the fuel cell system according to a second aspect of the present disclosure, in the above-described first aspect, the controller may be configured to assess that abnormality is present when the pressure of the recycling path that is upstream of the pressurizer or the pressure of the anode off-gas discharge path is a first threshold value or more.

In the above configuration, the abnormality assessment for the pressurizer may be performed in accordance with whether or not the pressure of the recycling path or the pressure of the anode off-gas discharge path is the first threshold value or more, regardless of the time change in the gas composition. Note that the first threshold value is a pressure value of the anode off-gas discharged from the fuel cell, which is obtained in consideration of the decrease in the pressure loss which occurs in the fuel cell when the flow amount of the anode off-gas which flows through the recycling path decreases compared to the flow amount in a normal operation state of the pressurizer. For example, the first threshold value may be set as the pressure value of the anode off-gas when the fuel gas of a flow amount as a lower limit value of the flow amount of the fuel gas that may maintain power generation of the fuel cell is supplied to the fuel cell.

Further, as for the fuel cell system according to a third aspect of the present disclosure, in the above-described first or second aspect, the controller may be configured to assess that abnormality is present when the pressure of the recycling path that is upstream of the pressurizer or the pressure of the anode off-gas discharge path is a second threshold value or less.

In the above configuration, the abnormality assessment for the pressurizer may be performed in accordance with whether or not the pressure of the recycling path or the pressure of the anode off-gas discharge path is the second threshold value or less, regardless of the time change in the gas composition. Thus, an assessment may be made about whether or not the fuel cell system is in a state where an excess flow amount of the anode off-gas over an appropriate flow amount is supplied to the fuel gas.

Note that the second threshold value is a pressure value of the anode off-gas discharged from the fuel cell, which is obtained in consideration of the increase in the pressure loss which occurs in the fuel cell when the flow amount of the anode off-gas which flows through the recycling path increases compared to the flow amount in the normal operation state of the pressurizer. For example, the second threshold value may be set as the pressure value of the anode off-gas when the fuel gas of a flow amount as an upper limit value of the flow amount of the fuel gas that may maintain power generation of the fuel cell is supplied to the fuel cell.

Further, as for the fuel cell system according a fourth aspect of the present disclosure, in any one aspect of the above-described first to third aspects, the controller may be configured to assess the abnormality at a start of the fuel cell.

In the above configuration, the controller performs an assessment of abnormality at a start of the fuel cell and may thus perform the abnormality assessment for the pressurizer before power generation of the fuel cell is started.

Further, in the above-described second aspect, the fuel cell system according to a fifth aspect of the present disclosure may be configured to further include a second valve that is provided in the fuel gas supply path, and the controller may be configured to perform control to close the second valve and to stop supply of the fuel gas from the fuel gas supply path when an assessment is made that the abnormality is present.

In the above configuration, when the pressurizer is assessed as abnormal, the controller may perform control to close the second valve and to stop the supply of the fuel gas from the fuel gas supply path. Thus, the fuel cell system may be inhibited from being operated in a state where abnormality occurs to the pressurizer.

Further, in any one aspect of the above-described first to fifth aspects, the fuel cell system according a sixth aspect of the present disclosure may be configured to further include an output device that outputs information which indicates the abnormality when the controller assesses that the abnormality is present.

In the above configuration, the output device may output the information that indicates abnormality of the pressurizer and may thus notify that a cause of stop of the operation of the fuel cell system is the pressurizer.

Note that examples of the output device include a display, a printer, a sound output device, and a light emitting unit. Particularly when the output device is a display, the display may visually notify that a cause of stop of the operation of the fuel cell system is the pressurizer.

Consequently, restoration work from the stop of the operation of the fuel cell system may quickly be performed.

A first embodiment of the present disclosure will hereinafter be described in detail with reference to drawings. Note that in the following, the same or corresponding elements will be provided with the same reference numerals through all the drawings, and descriptions thereof will not be repeated.

First Embodiment

[Device Configuration]

First, a configuration of a fuel cell system 50 according to the first embodiment will be described with reference to FIG. 1. FIG. 1 is a diagram that schematically illustrates one example of a configuration of principal components of the fuel cell system 50 according to the first embodiment of the present disclosure.

The fuel cell system 50 according to the first embodiment includes a fuel cell 1, a fuel gas supply path 2, an oxidant gas supply path 3, a controller 4, an anode off-gas discharge path 5, a cathode off-gas discharge path 6, a recycling path 7, a pressurizer 10, and a purge valve (first valve) 11.

The fuel cell 1 is a power generation device that generates power by an electrochemical reaction between fuel gas supplied to an anode and oxidant gas supplied to a cathode.

That is, the fuel cell 1 has a laminated body of a membrane electrode assembly (MEA) (not illustrated), and the MEA is configured with an electrolyte (not illustrated) that uses a polymer electrolyte membrane and an anode and a cathode that are arranged to interpose the electrolyte membrane between those. Each of the anode and the cathode is configured with a catalyst layer formed of carbon particles that support a noble metal catalyst such as platinum and a gas diffusion layer formed of carbon paper or carbon felt.

The MEA is interposed between a pair of separators, a fuel gas flow path is provided between one separator and the anode, and an oxidant gas flow path is provided between the other separator and the cathode. The fuel gas is supplied to the fuel gas flow path via the fuel gas supply path 2, and the oxidant gas is supplied to the oxidant gas flow path via the oxidant gas supply path 3. Accordingly, an electrochemical reaction occurs between the fuel gas and the oxidant gas, and power generation is thereby performed.

That is, the fuel gas supply path 2 is connected with an anode entrance of the fuel cell 1, and the fuel gas is supplied to the fuel gas flow path of the fuel cell 1 via the fuel gas supply path 2.

Meanwhile, the oxidant gas supply path 3 is connected with a cathode entrance of the fuel cell 1, and air as the oxidant gas is supplied to the oxidant gas flow path of the fuel cell 1 via the oxidant gas supply path 3.

Further, the recycling path 7 is connected with an anode exit of the fuel cell 1, and the anode off-gas discharged from the anode of the fuel cell 1 may be returned to the anode entrance of the fuel cell 1 via the recycling path 7. Further, the anode off-gas discharge path 5 which branches from the recycling path 7 is provided, and a configuration is made such that the anode off-gas discharged from the anode of the fuel cell 1 may be discharged to the outside of the fuel cell system 50 via the anode off-gas discharge path 5.

Meanwhile, the cathode off-gas discharge path 6 is connected with a cathode exit of the fuel cell 1, and cathode off-gas discharged from the cathode of the fuel cell 1 is discharged to the outside of the fuel cell system 50 via the cathode off-gas discharge path 6.

Note that in the fuel gas flow path as a flow path that is provided in the fuel cell 1 and is for supplying the fuel gas to the anode, an end portion on the side connected with the fuel gas supply path 2 will be referred to as anode entrance, and an end portion on the side connected with the recycling path 7 will be referred to as anode exit. Further, in the oxidant gas flow path as a flow path that is provided in the fuel cell 1 and is for supplying the oxidant gas to the cathode, an end portion on the side connected with the oxidant gas supply path 3 will be referred to as cathode entrance, and an end portion on the side connected with the cathode off-gas discharge path 6 will be referred to as cathode exit.

One end portion of the fuel gas supply path 2 is connected with a fuel gas supply source (not illustrated), and the other end portion of the fuel gas supply path 2 is connected with the anode entrance of the fuel cell 1. The fuel gas is supplied from the fuel gas supply source via the fuel gas supply path 2 and the fuel gas flow path to the anode. The fuel gas is hydrogen or gas that contains hydrogen, and reformed gas obtained through a reforming reaction of source gas such as city gas by a reformer and hydrogen obtained by water electrolysis or the like may be used, for example.

Piping of a flame-retardant material (for example, metal piping such as stainless steel piping) is in general used for the fuel gas supply path 2 because the fuel gas that flows on the inside is flammable gas. Note that the flow amount of the fuel gas supplied from the fuel gas supply path 2 is adjusted in accordance with the power generation amount of the fuel cell 1. Further, a humidifier for humidifying the fuel gas may be provided in the fuel gas supply path 2.

The pressure of the fuel gas supplied from the fuel gas supply source via the fuel gas supply path 2 is set to become regular based on the pressure loss of the fuel gas that flows through the fuel gas flow path of the fuel cell 1.

For example, in a case of a configuration in which source gas such as city gas is supplied to a reformer and reformed gas that is reformed by the reformer is used as the fuel gas, a primary pressure of the fuel gas supplied from the reformer via the fuel gas supply path 2 to the fuel cell 1 may become lower than the pressure loss of the fuel gas that flows through the fuel gas flow path because the pressure of the source gas supplied from a source gas supply source (not illustrated) to the reformer is low. In this case, a configuration is possible in which a pressurizer is provided in the fuel gas supply path 2 and the fuel gas is pressurized by the pressurizer and then supplied to the fuel gas flow path.

Meanwhile, for example, when the fuel gas supply source is a hydrogen tank or the like, the primary pressure of the fuel gas supplied from the fuel gas supply source via the fuel gas supply path 2 to the fuel cell 1 may become higher than the pressure loss of the fuel gas that flows through the fuel gas flow path. In this case, a configuration is possible in which a pressure adjuster (not illustrated) is provided in the fuel gas supply path 2, the pressure is adjusted to a prescribed pressure that is higher than the pressure loss, and the fuel gas is thereby supplied to the fuel cell 1 via the fuel gas supply path 2.

As described above, in the fuel cell system 50 according to the first embodiment, the pressure of the fuel gas supplied to the fuel cell 1 via the fuel gas supply path 2 is set to become regular based on the pressure loss of the fuel gas that flows through the fuel gas flow path of the fuel cell 1.

Note that the first embodiment will be described by raising a configuration in which the pressure of the fuel gas supplied to the fuel cell 1 via the fuel gas supply path 2 is set to become regular by using the pressure adjuster as an example. The pressure adjuster is a device that adjusts the pressure of the fuel gas which flows through the fuel gas supply path 2 and includes a driven type pressure adjusting valve and a regulator that make the pressure variable and a governor that adjusts the pressure to a regular value, for example. Accordingly, the pressure of the fuel gas supplied from the fuel gas supply source via the fuel gas supply path 2 to the fuel cell 1 is maintained regular.

An end portion of the oxidant gas supply path 3 is connected with the oxidant gas flow path of the fuel cell 1. Further, the oxidant gas is supplied from an oxidant gas supplier 8 via the oxidant gas supply path 3 and the oxidant gas flow path to the cathode. For example, air may be used for the oxidant gas. When air is used for the oxidant gas, the oxidant gas supplier 8 may be configured with a compressor, an electromagnetic induction type diaphragm pump, and so forth, for example. Accordingly, the oxidant gas may be pressurized by the oxidant gas supplier 8 and supplied to the oxidant gas flow path of the fuel cell 1. Note that a humidifier (not illustrated) for humidifying the oxidant gas may be provided in the oxidant gas supply path 3.

Incidentally, hydrogen in the fuel gas is used for power generation in the fuel cell 1, but hydrogen that is not used for power generation is still included in the anode off-gas discharged from the fuel cell 1. Thus, in order to reuse the anode off-gas as the fuel gas, the fuel cell system 50 according to the first embodiment includes the recycling path 7 whose one end portion is connected with the anode exit and whose other end portion is connected with the fuel gas supply path 2. Further, the fuel cell system 50 is configured such that the anode off-gas discharged from the fuel cell 1 is returned to the anode entrance via the recycling path 7.

In such a manner, the fuel gas supplied to the anode of the fuel cell 1 includes the fuel gas that is supplied from the fuel gas supply source and the anode off-gas that is supplied via the recycling path 7.

One end portion of the recycling path 7 is connected with the anode exit of the fuel cell 1, and the other end portion of the recycling path 7 is connected with the fuel gas supply path 2, for example. A circulation path that circulates the anode off-gas is configured with the fuel gas supply path 2 with respect to the flow of the fuel gas, the fuel gas flow path of the fuel cell 1, and the recycling path 7. Using the circulation path configured in such a manner, the fuel cell system 50 may cause the anode off-gas discharged from the anode exit to merge with the fuel gas that flows through the fuel gas supply path 2 and may again supply the anode off-gas and the fuel gas to the anode entrance of the fuel cell 1. Piping of a flame-retardant material (for example, metal piping such as stainless steel piping) is preferably used for the recycling path 7 because the anode off-gas that flows on the inside is flammable gas. Further, the pressurizer 10 is provided in the recycling path 7.

The pressurizer 10 is a pressurizing pump that raises the pressure of the anode off-gas which flows through the recycling path 7 and controls the flow amount of the anode off-gas caused to merge into the fuel gas supply path 2 in order to again supply the anode off-gas discharged from the anode exit to the anode entrance. For the pressurizer 10, for example, an electromagnetic induction type diaphragm pump which may adjust the flow amount of the anode off-gas by an input voltage may be used. Alternatively, the pressurizer 10 may be a turbo type (non-positive displacement type) pump that adjusts the flow amount of the anode off-gas by rotating an impeller.

In the fuel cell system 50 according to the first embodiment, the pressure of the anode off-gas that flows through the recycling path 7 by the pressure loss caused when the fuel gas flows through the fuel gas flow path of the fuel cell 1 becomes lower than the pressure of the fuel gas that flows through the fuel gas supply path 2. Thus, it may not be possible to cause the anode off-gas to flow from the recycling path 7 into the fuel gas supply path 2.

Accordingly, the pressurizer 10 placed in the recycling path 7 is used to raise the pressure of the anode off-gas that flows through the recycling path 7, and the anode off-gas is thereby caused to flow into the fuel gas supply path 2.

The anode off-gas discharge path 5 branches in a position on an upstream side of the pressurizer 10 with respect to the flow of recycle gas in the recycling path 7 and extends to the outside of the fuel cell system 50. Piping of a flame-retardant material (for example, metal piping such as stainless steel piping) is preferably used for the anode off-gas discharge path 5 because the anode off-gas that flows on the inside is flammable gas.

A purge valve 11 that adjusts the flow path of the anode off-gas discharge path 5 is provided in the anode off-gas discharge path 5. As the purge valve 11, for example, a solenoid valve may be used. The purge valve 11 is not particularly limited. Further, the purge valve 11 may be a control valve or an on-off valve. When the purge valve 11 is opened and becomes an open state, the anode off-gas that flows through the recycling path 7 is discharged to the outside via the anode off-gas discharge path 5 by passing through the purge valve 11.

The cathode off-gas discharge path 6 is connected with the cathode exit of the fuel cell 1 and discharges the cathode off-gas discharged from the oxidant gas flow path to the outside. For example, when a humidifier is provided in the oxidant gas supply path 3, the cathode off-gas includes water. Further, because water is generated in power generation in the fuel cell 1, the cathode off-gas also includes this water. Thus, for the cathode off-gas discharge path 6, piping which is not likely to be corroded by water (for example, stainless steel piping and resin piping of cross-linked polyethylene) is used.

The controller 4 performs various kinds of control of the units included in the fuel cell system 50 and includes an arithmetic unit such as a CPU (not illustrated), a storage unit such as a ROM or a RAM (not illustrated). The storage unit stores a basic program of the fuel cell system 50 and information such as various kinds of fixed data, for example. The arithmetic unit reads out and executes the basic program and so forth, and the controller 4 thereby controls actions of the units. Note that the controller 4 may be configured with a single controller 4 that performs centralized control or may be configured with plural controllers 4 that mutually and cooperatively perform distributed control.

Particularly, in the fuel cell system 50 according to the first embodiment, the controller 4 controls the pressurizer 10 to act in at least one of a timing in execution of a purge action in which the fuel gas is supplied from the fuel gas supply path 2 and the anode off-gas is discharged to the outside in a state where the purge valve 11 is opened and a timing in prescribed time after the purge action. Further, the controller 4 is configured to assess abnormality of the pressurizer 10 based on the pressure of the anode off-gas that flows through the recycling path 7 or the anode off-gas discharge path 5 or the action amount of the pressurizer 10 while such control is executed. For example, when the pressurizer 10 is a rotary pump, the rotational speed of the pump corresponds to the action amount. However, the action amount is not limited to this example.

That is, the controller 4 assesses abnormality of the pressurizer 10 in either one of a timing in execution of the purge action for discharging the anode off-gas to the outside and a timing in the prescribed time after the purge action or both of a timing in execution of the purge action for discharging the anode off-gas to the outside and a timing in the prescribed time after the purge action.

Further, the controller 4 assesses abnormality of the pressurizer 10 based on the pressure of the anode off-gas that flows through the recycling path 7 or the anode off-gas discharge path 5. That is, when the output of the pressurizer 10 lowers due to failure, the flow amount of the anode off-gas that flows through the recycling path 7 lowers. Thus, if the pressure of the fuel gas supplied to the fuel cell 1 through the fuel gas supply path 2 is regular, the pressure loss in the fuel cell 1 lowers, and the pressure of the anode off-gas discharged from the anode exit of the fuel cell 1 becomes high compared to a case where the pressurizer 10 normally works. Thus, an assessment may be made about whether or not abnormality of the pressurizer 10 is present from the pressure of the anode off-gas that flows through the recycling path 7 or the anode off-gas discharge path 5.

Note that the controller 4 may be configured to obtain the value of the pressure of the anode off-gas based on a detection result by a pressure detector that measures the pressure of the anode off-gas which flows through the recycling path 7 or the anode off-gas discharge path 5. Alternatively, the controller 4 may be configured to obtain the value of the pressure of the anode off-gas based on a detection result by a detector that detects any physical quantity which correlates with the pressure of the anode off-gas.

Specifically, the controller 4 assesses that abnormality is present when the pressure of the recycling path 7 that is upstream of the pressurizer 10 or the pressure of the anode off-gas discharge path 5 is a first threshold value or more. Note that the first threshold value is a pressure value of the anode off-gas discharged from the fuel cell 1, which is obtained in consideration of the decrease in the pressure loss which occurs in the fuel cell 1 when the flow amount of the anode off-gas which flows through the recycling path 7 decreases compared to the flow amount in a normal operation state of the pressurizer 10. For example, the first threshold value may be set as the pressure value of the anode off-gas when the fuel gas of a flow amount as a lower limit value of the flow amount of the fuel gas that may maintain power generation of the fuel cell 1 is supplied to the fuel cell 1.

In addition, the controller 4 assesses that abnormality is present when the pressure of the recycling path 7 that is upstream of the pressurizer 10 or the pressure of the anode off-gas discharge path 5 is a second threshold value or less. Note that the second threshold value is a pressure value of the anode off-gas discharged from the fuel cell 1, which is obtained in consideration of the increase in the pressure loss which occurs in the fuel cell 1 when the flow amount of the anode off-gas which flows through the recycling path 7 increases compared to the flow amount in the normal operation state of the pressurizer 10. For example, the second threshold value may be set as the pressure value of the anode off-gas when the fuel gas of a flow amount as an upper limit value of the flow amount of the fuel gas that may maintain power generation of the fuel cell 1 is supplied to the fuel cell 1.

Alternatively, the controller 4 may assess abnormality of the pressurizer 10 based on the action amount of the pressurizer 10. In other words, when abnormality occurs to the pressurizer 10, the output (action amount) with respect to a prescribed indicated value changes compared to a case where the pressurizer 10 normally works. Accordingly, the controller 4 monitors the output (action amount) of the pressurizer 10. Then, the controller 4 assesses whether or not abnormality of the pressurizer 10 is present from the change in the action amount of the pressurizer 10 with respect to the prescribed indicated value. For example, when the action amount of the pressurizer 10 with respect to the prescribed indicated value is a first action amount threshold value or less or a second action amount threshold value or more, which is greater than the first action amount threshold value, an assessment may be made that the pressurizer 10 is abnormal.

Note that the controller 4 may be configured to recognize the change in the action amount of the pressurizer 10 based on a detection result of a detector that detects the change amount in the action amount of the pressurizer 10, for example.

Second Embodiment

[Device Configuration]

Figure 2:
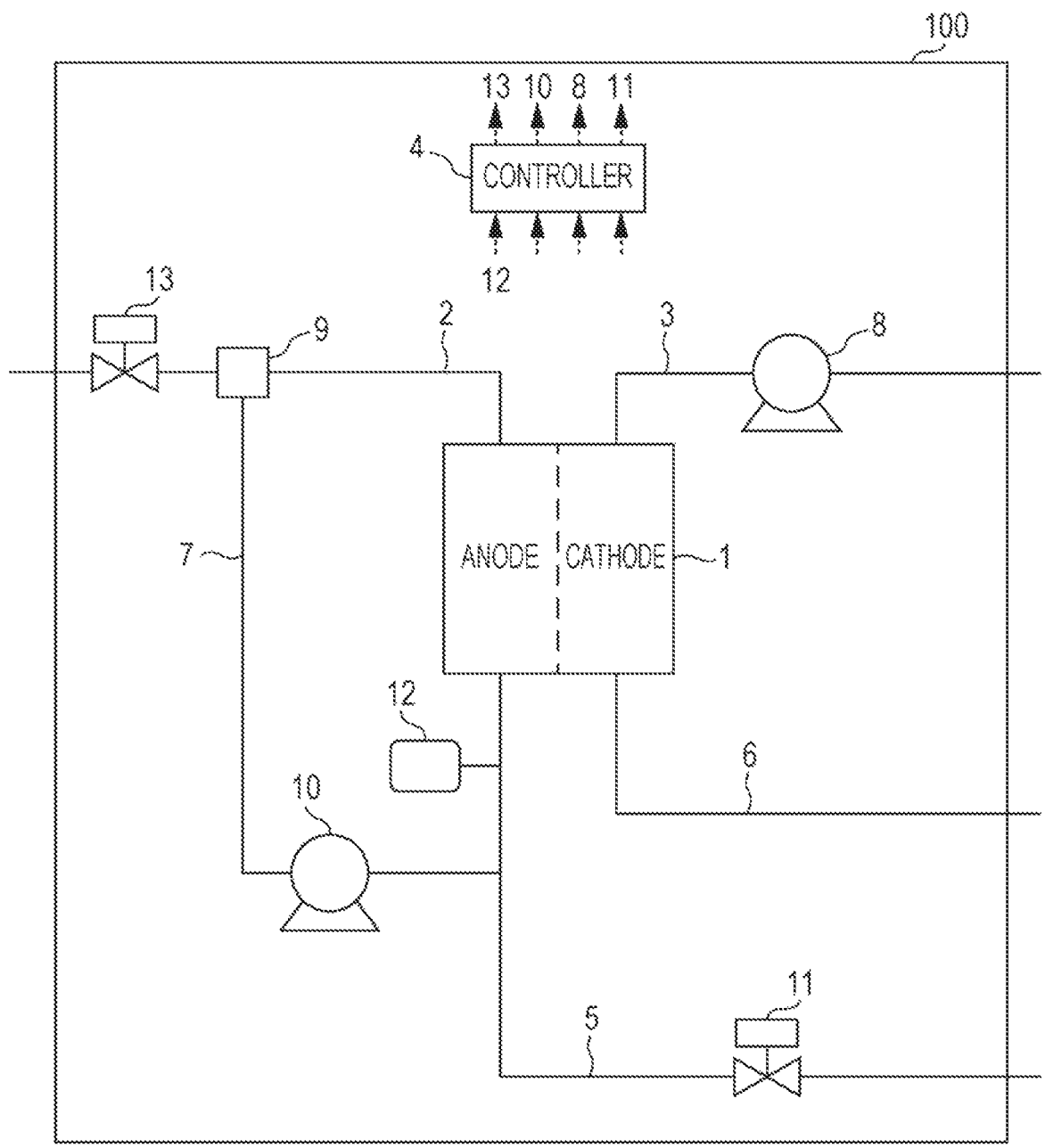
FIG. 2 is a diagram that schematically illustrates one example of a configuration of principal components of a fuel cell system according to a second embodiment of the present disclosure.

Next, a configuration of a fuel cell system 100 according to a second embodiment will be described with reference to FIG. 2. FIG. 2 is a diagram that schematically illustrates one example of a configuration of principal components of the fuel cell system 100 according to the second embodiment of the present disclosure. In the configuration of the fuel cell system 50 according to the first embodiment, the fuel cell system 100 according to the second embodiment further includes the oxidant gas supplier 8, a pressure detector 12, and a fuel gas supply valve (second valve) 13. That is, the fuel cell system 100 is configured to include the oxidant gas supplier 8 as one example of a device that supplies the oxidant gas to the fuel cell 1, the pressure detector 12 as one example of a device that detects the pressure of the anode off-gas, and the fuel gas supply valve 13 as one example of a device that controls the supply amount of the fuel gas. Further, a merging unit 9 is provided as a connection point between the fuel gas supply path 2 and the recycling path 7. One end portion of the recycling path 7 is connected with the anode exit of the fuel cell 1, and the other end portion of the recycling path 7 is connected with the merging unit 9 of the fuel gas supply path 2. A circulation path that circulates the anode off-gas is configured with a portion of the fuel gas supply path 2 on a downstream side of the merging unit 9 with respect to the flow of the fuel gas, the fuel gas flow path of the fuel cell 1, and the recycling path 7. The fuel cell system 100 according to the second embodiment has a similar configuration to the fuel cell system 50 according to the first embodiment except for a point that the fuel cell system 100 further includes the above members. Thus, the same reference numerals are provided to similar members, and descriptions thereof will not be made.

The fuel gas supply valve 13 is provided to the portion in the fuel gas supply path 2, which is upstream of the merging unit 9 with respect to the flow of the fuel gas. The fuel gas supply valve 13 is a regulator valve that makes the fuel gas supply path 2 an open state to supply the fuel gas to the anode of the fuel cell 1 and makes the fuel gas supply path 2 a closed state to block supply of the fuel gas to the anode of the fuel cell 1. It is sufficient that the fuel gas supply valve 13 may adjust the flow amount of the fuel gas. For example, a solenoid valve may be raised as an example.

The pressure detector 12 is provided to a portion between the anode exit of the fuel cell 1 and the pressurizer 10 in the recycling path 7 or a portion between the anode exit and the purge valve 11. Note that the portion between the anode exit and the purge valve 11 is a section in which a portion of the recycling path 7 from a connection point with the anode exit to a connection point with the anode off-gas discharge path 5 is combined with a portion of the anode off-gas discharge path 5 from a connection point with the recycling path 7 to the purge valve 11.

The pressure detector 12 may be any unit that may measure the pressure of the anode off-gas which flows through the anode off-gas discharge path 5 and is not particularly limited. The pressure detector 12 may be a diaphragm type pressure sensor that measures a gauge pressure, for example.

[Abnormality Assessment Process for Pressurizer]

Figure 3:
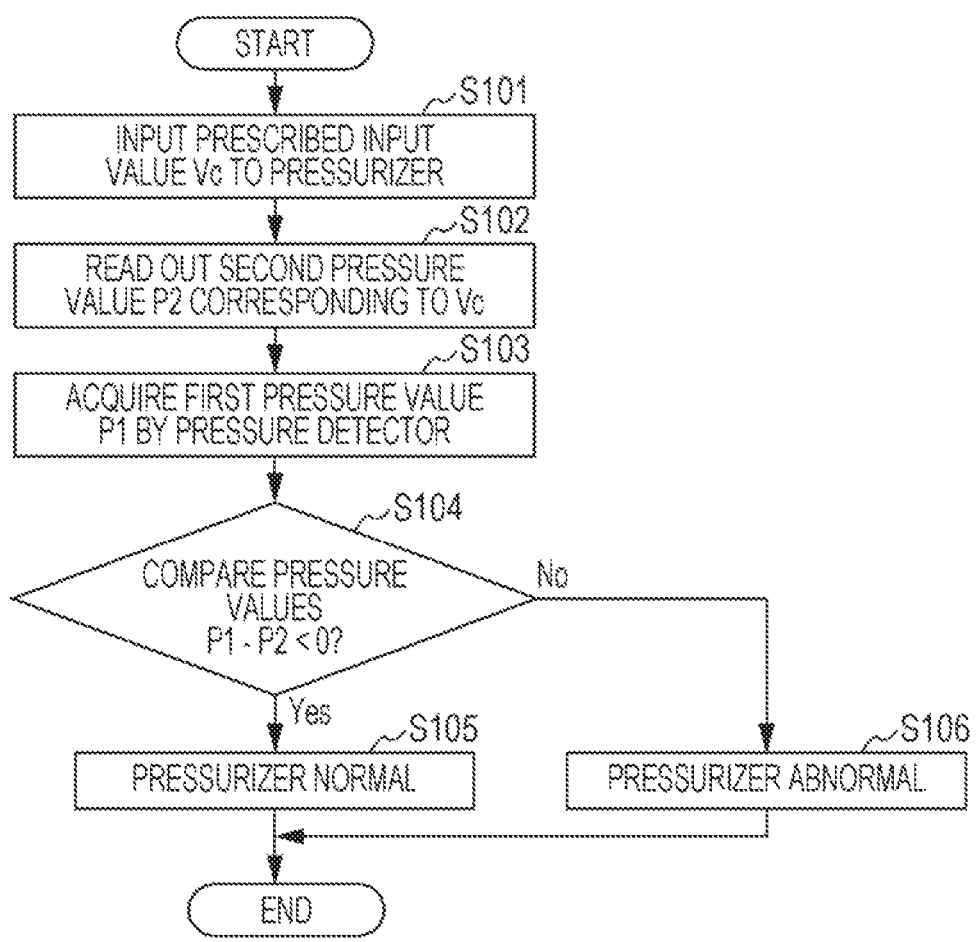
FIG. 3 is a flowchart that illustrates one example of an abnormality assessment process of the fuel cell system according to the second embodiment of the present disclosure.
Figure 4:
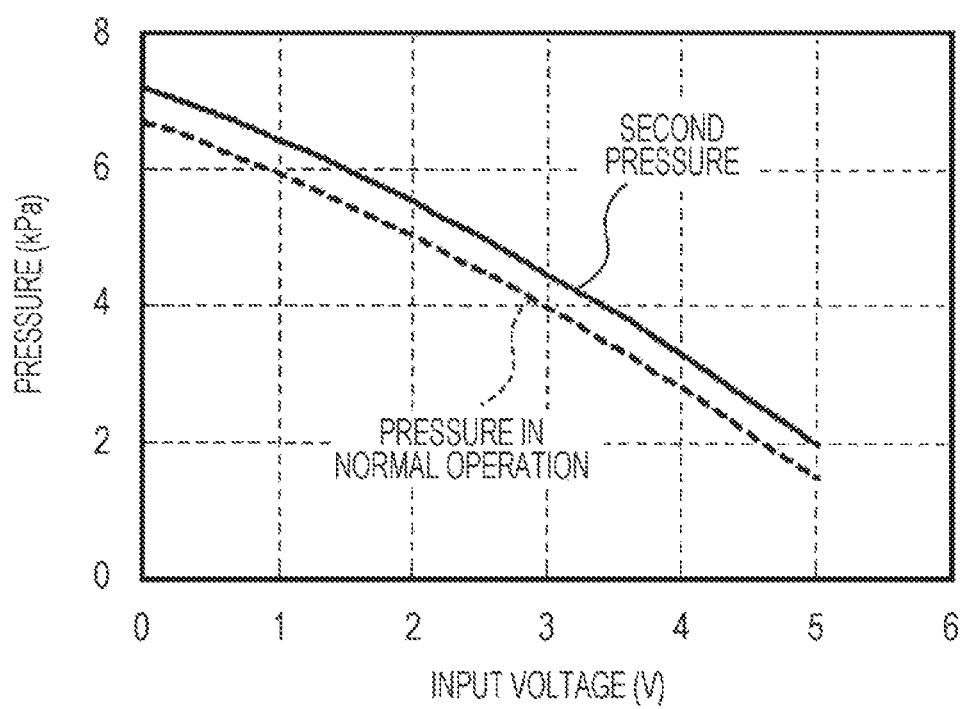
FIG. 4 is a graph that represents one example of the relationship between an input value and a second pressure value in the fuel cell system according to the second embodiment of the present disclosure.

Next, an abnormality assessment process for the pressurizer 10, which is conducted by the fuel cell system 100, will be described with reference to FIGS. 3 and 4. FIG. 3 is a flowchart that illustrates one example of the abnormality assessment process of the fuel cell system 100 according to the second embodiment of the present disclosure. FIG. 4 is a graph that represents one example of the relationship between an input value Vc and a second pressure value P2 (first threshold value) in the fuel cell system 100 according to the second embodiment of the present disclosure. In FIG. 4, the vertical axis represents the pressure, the horizontal axis represents the input voltage as the input value Vc, the broken line represents the relationship between the input value Vc and the pressure value in a normal operation of the fuel cell system 100, and the solid line represents the relationship between the input value Vc and the second pressure value P2. Note that the abnormality assessment process for the pressurizer 10 is conducted in a timing in execution of the purge action in which the fuel gas is supplied from the fuel gas supply path 2 to the fuel cell 1 and the anode off-gas discharged from the fuel cell 1 is discharged to the outside in a state where the purge valve 11 is opened or a timing in prescribed time after the purge action or both of a timing in execution of the purge action and a timing in the prescribed time after the purge action.

Here, when the pressure value with respect to the input value Vc in the normal operation of the fuel cell system 100 is set as a reference value, the second pressure value P2 is the pressure value that corresponds to a lower limit value of the fuel gas flow amount at which the fuel cell 1 may maintain power generation. In other words, the second pressure value P2 is the pressure value of the anode off-gas when the fuel gas of a flow amount as the lower limit value of the flow amount of the fuel gas that may maintain power generation of the fuel cell 1 is supplied to the fuel cell 1, the pressure value being set corresponding to the input value Vc.

Consequently, the second pressure value P2 is a pressure value, which is obtained in consideration of the decrease in the pressure loss which occurs in the fuel cell 1 when the flow amount of the anode off-gas which flows through the recycling path 7 decreases compared to the flow amount in the normal operation state. Note that the lower limit value of the fuel gas flow amount at which the fuel cell 1 may maintain power generation may be considered to be a lower limit value in the range of the flow amount of the fuel gas, which is requested for obtainment of a power generation amount set in the fuel cell 1, and may be considered to be the flow amount from which a prescribed power generation amount may not be obtained if the flow amount of the fuel gas is below the lower limit value.

For example, when the flow amount of the anode off-gas supplied to the merging unit 9 lowers because some sort of abnormality occurs to the pressurizer 10, the flow amount of the fuel gas supplied to the anode entrance of the fuel cell 1 also lowers. Thus, the pressure loss that occurs in the fuel cell 1 also becomes small.

Here, as described above, because the fuel cell system 100 according to the second embodiment is set such that the pressure of the fuel gas supplied to the fuel cell 1 via the fuel gas supply path 2 becomes regular, the relationship is present in which the pressure of the anode off-gas discharged from the fuel cell 1 becomes higher than the normal operation state of the fuel cell system 100. In other words, the flow amount of the fuel gas supplied to the anode of the fuel cell 1 may be recognized based on the pressure detected by the pressure detector 12. Accordingly, the fuel cell system 100 according to the second embodiment sets the second pressure value P2 as the pressure value that corresponds to the lower limit value of the fuel gas flow amount at which the fuel cell 1 may maintain power generation and in advance stores, in a storage unit, a graph which represents the correspondence relationship between the second pressure value P2 and the input value Vc (input voltage) input to the pressurizer 10.

First, the controller 4 inputs a prescribed input value Vc to the pressurizer 10 (step S101). Here, a certain voltage value as the input value Vc is input to the pressurizer 10. However, the input value Vc is not limited to this, but a configuration is possible in which a pulse which indicates a voltage value is input as the input value Vc.

Next, the controller 4 reads out the second pressure value P2 that corresponds to the input value Vc from the storage unit (step S102). That is, as illustrated in FIG. 4, the storage unit in advance stores information that indicates the relationship between the input value Vc and the second pressure value P2. Accordingly, the controller 4 reads out the second pressure value P2 that corresponds to the prescribed input value Vc based on the stored information.

Then, the controller 4 acquires a first pressure value P1 detected by the pressure detector 12 (step S103), measures the difference between the first pressure value P1 and the second pressure value P2, and assesses whether or not the difference is less than zero (step S104). Here, in a case of P1−P2<0 ("Yes" in step S104), the controller 4 determines that the flow amount of the anode off-gas supplied by the pressurizer 10 is not insufficient and the pressurizer 10 is normal (step S105). On the other hand, in a case of P1−P2>0 ("No" in step S104), the controller 4 determines that the flow amount of the anode off-gas supplied by the pressurizer 10 is insufficient and abnormality occurs to the pressurizer 10 (step S106).

In such a manner, the controller 4 inputs a prescribed input value Vc to the pressurizer 10, compares the first pressure value P1 detected by the pressure detector 12 with the second pressure value P2 stored in advance, and may thereby assess whether or not abnormality occurs to the pressurizer 10 and the flow amount of the anode off-gas that merges with the fuel gas in the fuel gas supply path 2 through the recycling path 7 is insufficient. Thus, based on an assessment result of the abnormality assessment process for the pressurizer 10, the controller 4 may determine whether or not the operation of the fuel cell system 100 according to the second embodiment may be continued.

Modification Example 1

A description will be made about the fuel cell system 100 according to a modification example 1 of the second embodiment. Note that a configuration of the fuel cell system 100 according to the modification example 1 is a similar configuration to the fuel cell system 100 according to the second embodiment. Thus, a description about a device configuration will not be made.

[Abnormality Assessment Process for Pressurizer]

Figure 5:
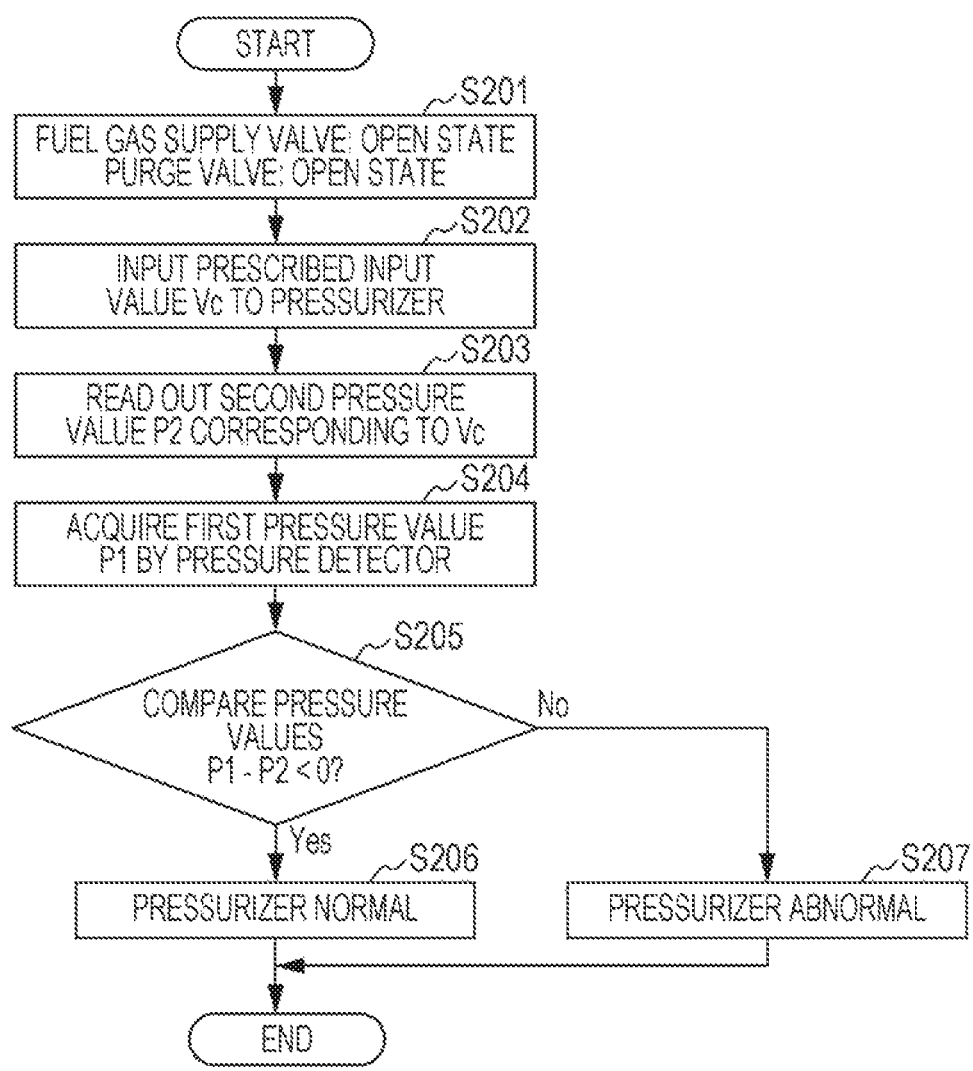
FIG. 5 is a flowchart that illustrates one example of an abnormality assessment process of the fuel cell system according to a modification example 1 of the second embodiment of the present disclosure.

Next, an operation method of the fuel cell system 100 according to the modification example 1 of the second embodiment will be described with reference to FIG. 5. FIG. 5 is a flowchart that illustrates one example of an abnormality assessment process of the fuel cell system 100 according to the modification example 1 of the second embodiment of the present disclosure. The abnormality assessment process for the pressurizer 10 is conducted in a timing in execution of the purge action or a timing in prescribed time after the purge action or both of a timing in execution of the purge action and a timing in the prescribed time after the purge action. As for the fuel cell system 100 according to the modification example 1 of the second embodiment, a description will be made by raising a case where each of the fuel gas supply valve 13 and the purge valve 11 is in an opened state and the abnormality assessment process for the pressurizer 10 is performed in execution of the purge action as an example. The fuel cell system 100 according to the modification example 1 of the second embodiment performs the abnormality assessment process for the pressurizer 10 similarly to the fuel cell system 100 according to the second embodiment except for a point that the timing for performing the abnormality assessment process is limited.

That is, the controller 4 first makes the fuel gas supply valve 13 and the purge valve 11 the open state (step S201). In a timing when the fuel gas supply valve 13 and the purge valve 11 are in the open state as described above, the controller 4 inputs a prescribed input value Vc to the pressurizer 10 (step S202). A subsequent process to this (a process of step S203 to step S207) is similar to the process of step S102 to step S106 of the abnormality assessment process illustrated in FIG. 3, and a description will thus not be made.

Here, the magnitude of the pressure loss that occurs in the fuel cell 1 depends on the composition of the fuel gas that flows through the fuel cell 1. Further, in a closed circuit operation in which the anode off-gas is repeatedly circulated in the fuel gas supply path 2 in a state where the purge valve 11 is closed, nitrogen is gradually included in the anode off-gas, and the composition of the fuel gas thus changes.

Accordingly, in the fuel cell system 100 according to the modification example 1, the controller 4 performs the abnormality assessment process for the pressurizer 10 while the fuel gas supply valve 13 and the purge valve 11 are made the open state. Thus, when the abnormality assessment process for the pressurizer 10 is performed, nitrogen and so forth that are produced in power generation of the fuel cell 1 may be discharged to the outside through the purge valve 11. Therefore, an abnormality assessment for the pressurizer 10 may be performed while the fuel gas that flows through the fuel gas flow path in the fuel cell 1 is made gas with fixed composition.

Consequently, the relationship between a prescribed input value Vc and the second pressure value P2 may be obtained regardless of the time change in the composition of the fuel gas. Thus, the relation formula between the input value Vc and the second pressure value P2 may be simplified, errors in the relationship between the input value Vc and the second pressure value P2 due to the difference in the gas composition may be lessened, and the abnormality assessment for the pressurizer 10 may thereby be performed precisely.

Modification Example 2

[Device Configuration]

The fuel cell system 100 according to a modification example 2 of the second embodiment is different compared to the fuel cell system 100 according to the second embodiment in a point that the storage unit in advance stores a graph that represents the correspondence relationship between each of the second pressure value P2 and a third pressure value P3 (second threshold value) and the input value Vc (input voltage) input to the pressurizer 10. That is, the fuel cell system 100 according to the modification example 2 sets the second pressure value P2 as the pressure value that corresponds to a lower limit value of the fuel gas which is requested for maintenance of power generation of the fuel cell 1 and sets the third pressure value P3 as a pressure value that corresponds to an upper limit value. Further, the storage unit in advance stores the graph that represents the correspondence relationship between each of the second pressure value P2 and the third pressure value P3 and the input value Vc (input voltage) input to the pressurizer 10.

The third pressure value P3 is the pressure value that corresponds to an upper limit value of the fuel gas flow amount at which the fuel cell 1 may maintain power generation. In other words, the third pressure value P3 is the pressure value of the anode off-gas when the fuel gas of a flow amount as the upper limit value of the flow amount of the fuel gas that may maintain power generation of the fuel cell 1 is supplied to the fuel cell 1, the pressure value being set corresponding to the input value Vc.

Consequently, the third pressure value P3 is a pressure value, which is obtained in consideration of the increase in the pressure loss which occurs in the fuel cell 1 when the flow amount of the anode off-gas which flows through the recycling path 7 increases compared to the flow amount in the normal operation state.

In such a manner, the configuration of the fuel cell system 100 according to the modification example 2 is similar to the configuration of the fuel cell system 100 according to the second embodiment except for a point that the storage unit in advance stores the graph that represents the correspondence relationship between each of the second pressure value P2 and the third pressure value P3 and the input value Vc. Thus, configurations of the units will not be described.

[Abnormality Assessment Process for Pressurizer]

Figure 6:
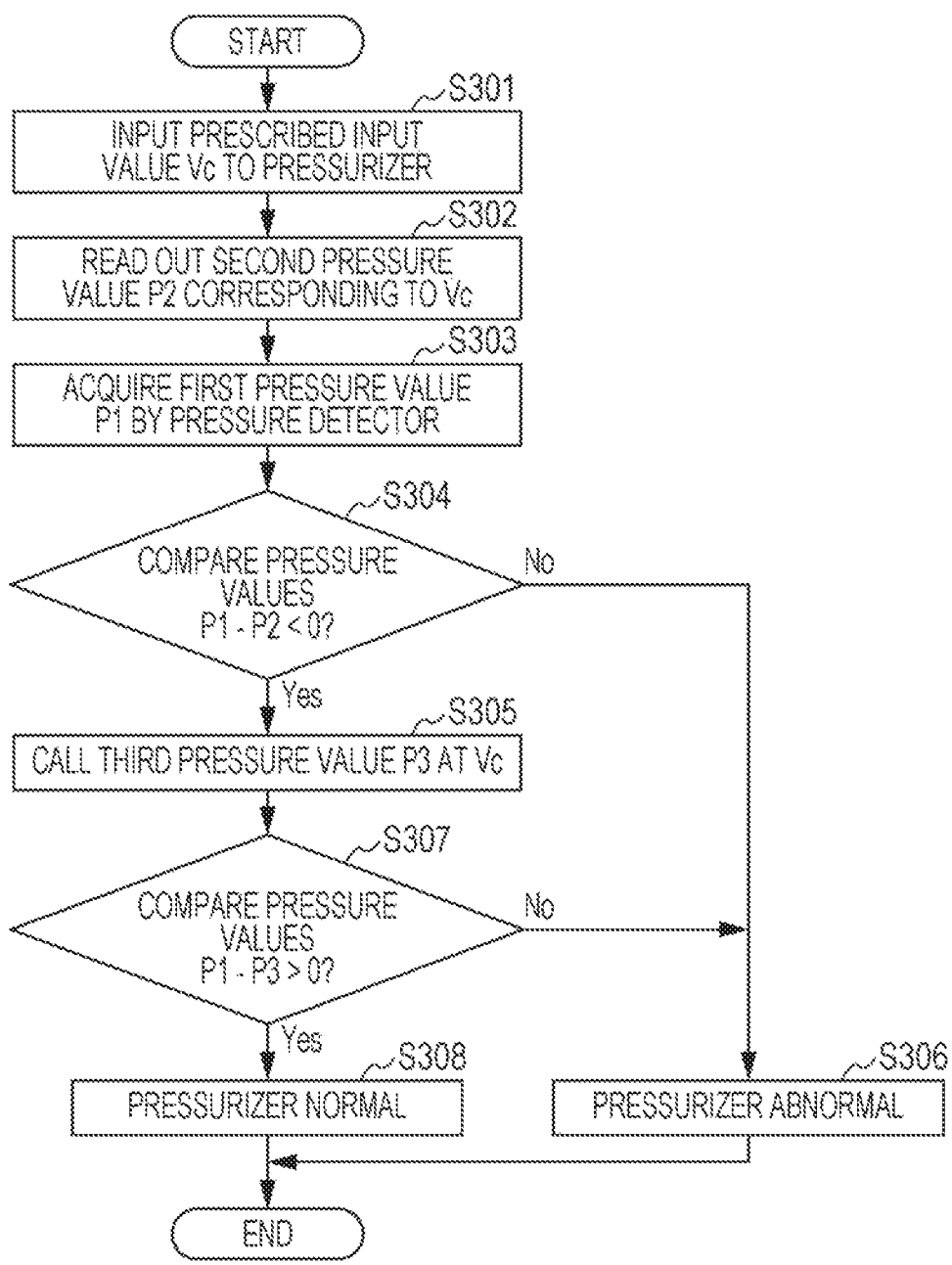
FIG. 6 is a flowchart that illustrates one example of an abnormality assessment process of the fuel cell system according to a modification example 2 of the second embodiment of the present disclosure.
Figure 7:
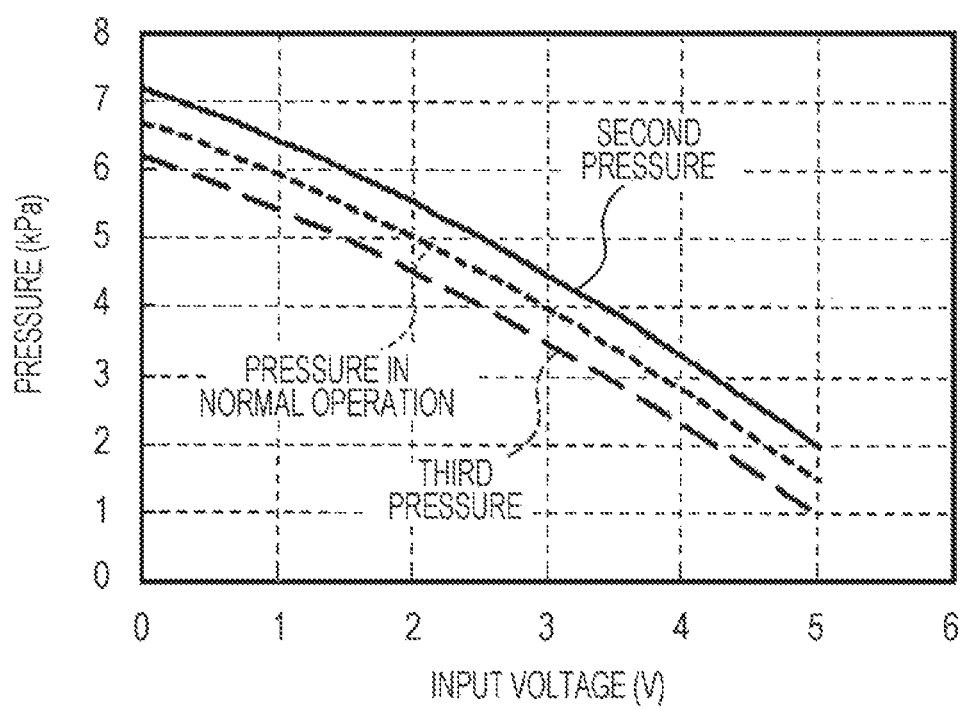
FIG. 7 is a graph that represents one example of the relationship among an input value, a second pressure value, and a third pressure value in the fuel cell system according to the modification example 2 of the second embodiment of the present disclosure.

An operation method of the fuel cell system 100 according to the modification example 2 will be described with reference to FIGS. 6 and 7. FIG. 6 is a flowchart that illustrates one example of an abnormality assessment process of the fuel cell system 100 according to the modification example 2 of the second embodiment of the present disclosure. FIG. 7 is a graph that represents one example of the relationship among the input value Vc, the second pressure value P2, and the third pressure value P3 in the fuel cell system 100 according to the modification example 2 of the second embodiment of the present disclosure. In FIG. 7, the vertical axis represents the pressure, the horizontal axis represents the input voltage, the broken line with shorter line segments represents the relationship between the input value Vc and the pressure value in the normal operation of the fuel cell system 100, the solid line represents the relationship between the input value Vc and the second pressure value P2, and the broken line with longer line segments represents the relationship between the input value Vc and the third pressure value P3.

Here, when the pressure value with respect to the input value Vc in the normal operation of the fuel cell system 100 according to the modification example 2 is set as a reference value, the second pressure value P2 is the pressure value that corresponds to the lower limit value of the fuel gas flow amount at which the fuel cell 1 may maintain power generation. Meanwhile, the third pressure value P3 is the pressure value that corresponds to the upper limit value of the fuel gas flow amount at which the fuel cell 1 may maintain power generation. The upper limit value of the fuel gas flow amount at which the fuel cell 1 may maintain power generation may be considered to be an upper limit value in the range of the flow amount of the fuel gas, which is requested for obtainment of a power generation amount set in the fuel cell 1. When the flow amount of the fuel gas exceeds the upper limit value, the flow amount that exceeds the upper limit value may be considered to be an excess flow amount.

As illustrated in FIG. 6, a process of step S301 to step S303 of the abnormality assessment process for the pressurizer 10, which is conducted in the fuel cell system 100 according to the modification example 2, is similar to the process of step S101 to step S103 of the abnormality assessment process for the pressurizer 10, which is conducted in the fuel cell system 100 according to the second embodiment. Thus, a description thereof will not be made, and a description will be made about a process of step S304 and subsequent steps. Note that the abnormality assessment process for the pressurizer 10 in the fuel cell system 100 according to the modification example 2 of the second embodiment is conducted, similarly to the fuel cell system 100 according to the second embodiment, in a timing in execution of the purge action or a timing in prescribed time after the purge action or both of a timing in execution of the purge action and a timing in the prescribed time after the purge action.

That is, in the fuel cell system 100 according to the modification example 2, in step S304, the controller 4 measures the difference between the first pressure value P1 and the second pressure value P2 and assesses whether or not the difference is less than zero (step S304). Here, in a case of P1−P2>0 ("No" in step S304), the controller 4 determines that the flow amount of the anode off-gas supplied by the pressurizer 10 is insufficient and abnormality occurs to the pressurizer 10 (step S306). On the other hand, in a case of P1−P2<0 ("Yes" in step S304), the controller 4 determines that the flow amount of the anode off-gas supplied by the pressurizer 10 is not insufficient. Then, the controller 4 reads out a third pressure value P3 that corresponds to the prescribed input value Vc from the storage unit (step S305). That is, as illustrated in FIG. 7, the storage unit in advance stores information that indicates the relationship between the input value Vc and the second pressure value P2 and the relationship between the input value Vc and the third pressure value P3. Accordingly, the controller 4 reads out the third pressure value P3 that corresponds to the prescribed input value Vc based on the stored information.

Then, the controller 4 measures the difference between the first pressure value P1 detected by the pressure detector 12 and the third pressure value P3 and assesses whether or not the difference is greater than zero (step S307). Here, when the controller 4 determines that P1−P3>0 ("Yes" in step S307), the controller 4 determines that the anode off-gas is not excessively supplied by the pressurizer 10 compared to the flow amount that is requested for power generation and the pressurizer 10 is normal (step S308). On the other hand, when the controller 4 determines that P1−P3<0 ("No" in step S307), the controller 4 determines that the anode off-gas is excessively supplied by the pressurizer 10 compared to the flow amount that is requested for power generation and the pressurizer 10 is abnormal (step S306).

In such a manner, the controller 4 inputs a prescribed input value Vc to the pressurizer 10, compares the first pressure value P1 detected by the pressure detector 12 with the second pressure value P2 and the third pressure value P3, and may thereby assess whether or not abnormality occurs to the pressurizer 10 and the flow amount of the anode off-gas supplied through the recycling path 7 is insufficient or whether or not the flow amount is excess. Thus, based on an assessment result of the abnormality assessment process for the pressurizer 10, the controller 4 may determine whether or not the operation of the fuel cell system 100 according to the modification example 2 of the second embodiment may be continued.

Modification Example 3

A description will be made about the fuel cell system 100 according to a modification example 3 of the second embodiment. Note that a configuration of the fuel cell system 100 according to the modification example 3 is a similar configuration to the fuel cell system 100 according to the second embodiment. Thus, a description about a device configuration will not be made.

[Abnormality Assessment Process for Pressurizer]

Figure 8:
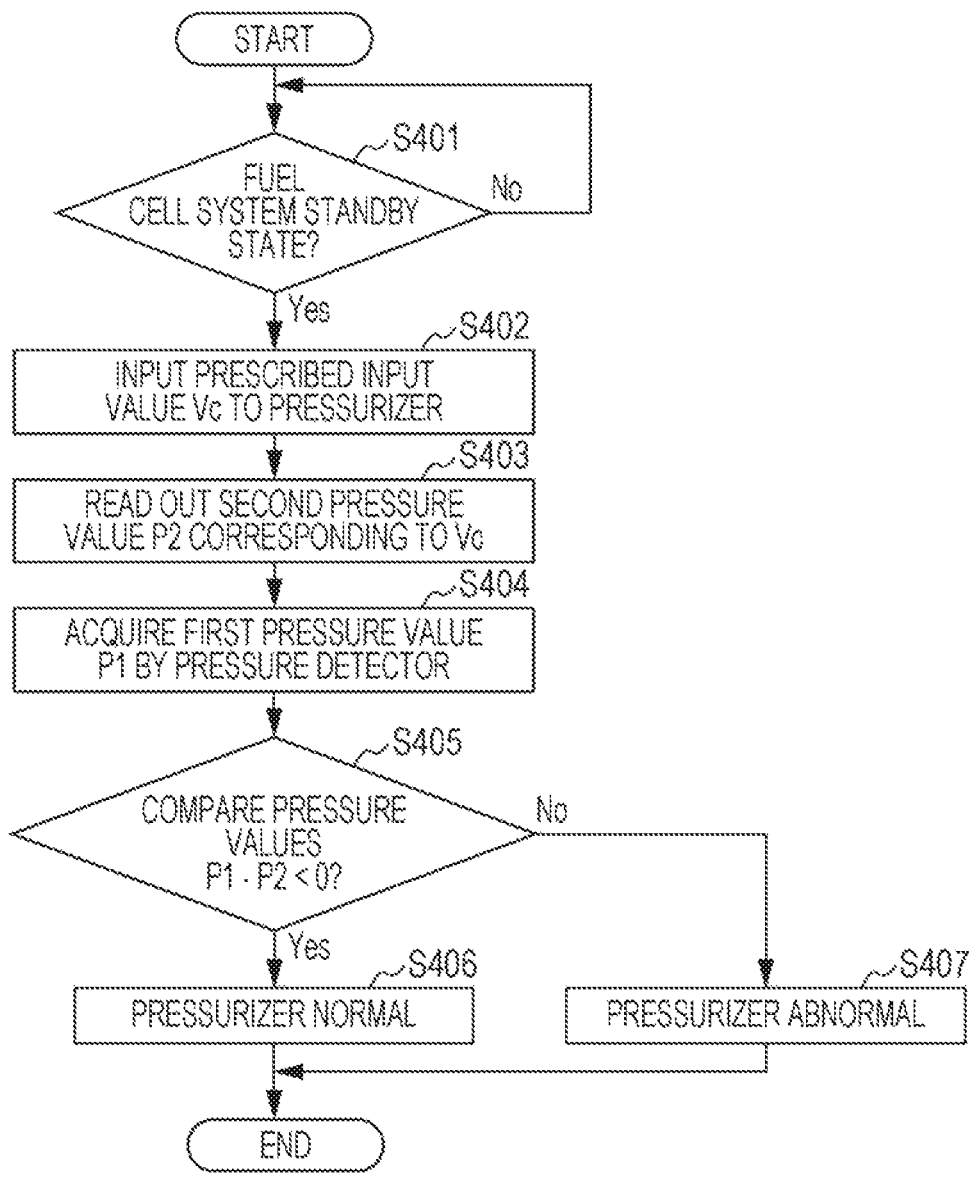
FIG. 8 is a flowchart that illustrates one example of an abnormality assessment process of the fuel cell system according to a modification example 3 of the second embodiment of the present disclosure.

Next, an operation method of the fuel cell system 100 according to the modification example 3 of the second embodiment will be described with reference to FIG. 8. FIG. 8 is a flowchart that illustrates one example of an abnormality assessment process of the fuel cell system 100 according to the modification example 3 of the second embodiment of the present disclosure. The fuel cell system 100 according to the modification example 3 of the second embodiment is different compared to the fuel cell system 100 according to the second embodiment in a point that the fuel cell system 100 performs the abnormality assessment process for the pressurizer 10 in a timing in execution of the purge action in a standby state of the fuel cell system 100 or a timing in prescribed time after the purge action or both of a timing in execution of the purge action and a timing in the prescribed time after the purge action but performs a similar process to the fuel cell system 100 according to the second embodiment except for a point that timing for performing the abnormality assessment process is limited.

That is, the controller 4 first assesses whether or not the fuel cell system 100 is in the standby state (either one of a timing in execution of the purge action or a timing in the prescribed time after the purge action) (step S401). When the controller 4 assesses that the fuel cell system 100 is in the standby state ("Yes" in step S401), the controller 4 inputs a prescribed input value Vc to the pressurizer 10 (step S402). On the other hand, when the controller 4 assesses that the fuel cell system 100 is not in the standby state ("No" in step S401), the controller 4 repeats the assessment in step S401 again. Note that the standby state of the fuel cell system 100 is a state where the temperature of the fuel cell 1 does not reach the temperature for power generation (steady operation) and the fuel cell 1 does not supply power to an external load. For example, a state of the fuel cell system 100 at a start may be raised as an example. The start mentioned here is a period after a stop command is input to the fuel cell system until a start command is input or a period after the stop command is input until the start command is input and the temperature of the fuel cell (the temperature of a stack of the fuel cell) rises to a prescribed temperature in power generation (steady operation) and is a state where power is not supplied to the external load. The prescribed temperature in power generation (steady operation) is preset in accordance with the configuration of the stack of the fuel cell.

A subsequent process to this (a process of step S402 to step S407) is similar to the process of step S101 to step S106 of the abnormality assessment process illustrated in FIG. 3, and a description will thus not be made.

In such a manner, the fuel cell system 100 according to the modification example 3 may assess whether or not the pressurizer 10 is abnormal before power generation of the fuel cell 1. Thus, failure of the fuel cell system 100 due to abnormality of the pressurizer 10 may be avoided before power generation is performed.

Modification Example 4

Next, a description will be made about the fuel cell system 100 according to a modification example 4 of the second embodiment. Note that a configuration of the fuel cell system 100 according to the modification example 4 is a similar configuration to the fuel cell system 100 according to the second embodiment. Thus, a description about a device configuration will not be made.

[Abnormality Assessment Process for Pressurizer]

Figure 9:
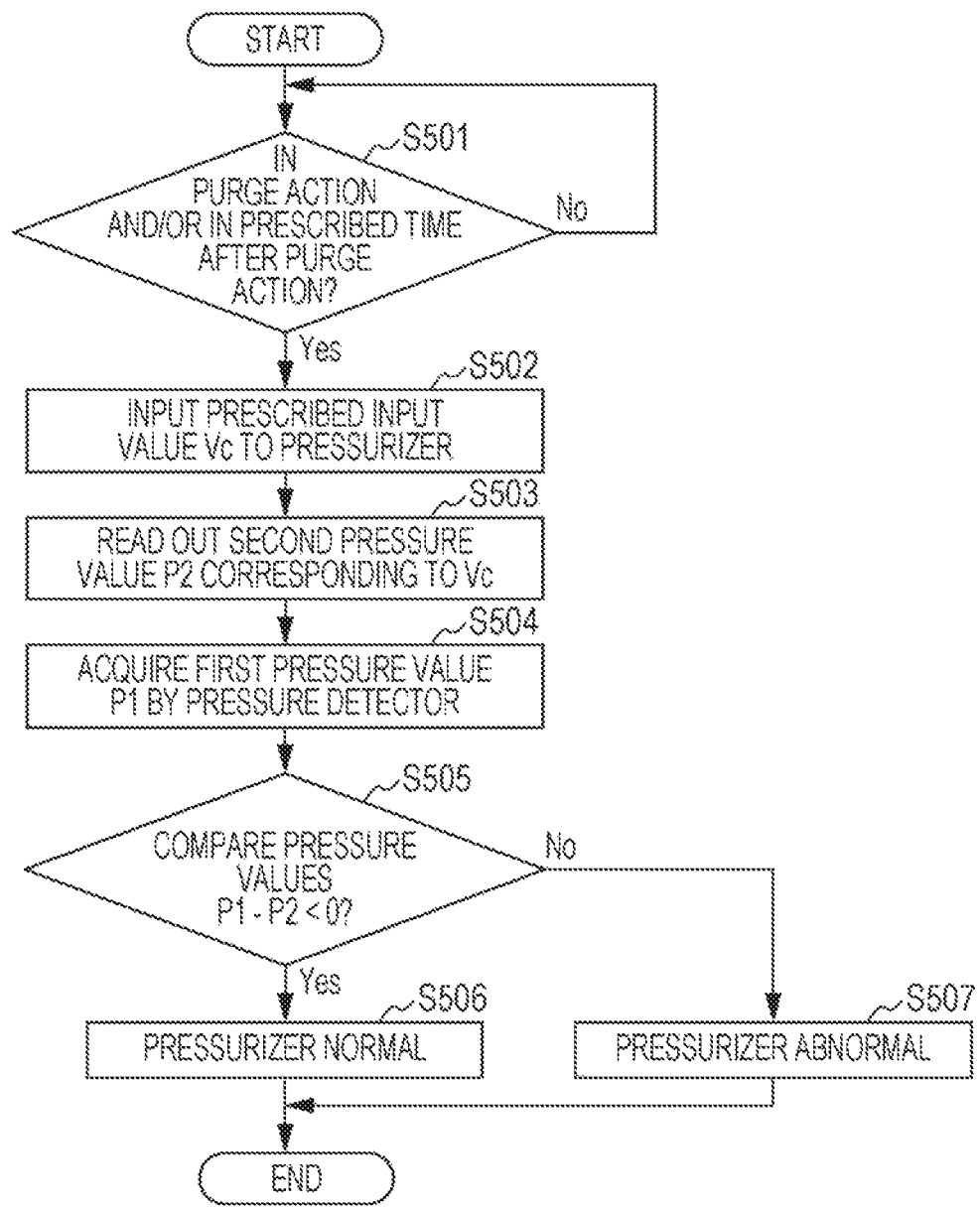
FIG. 9 is a flowchart that illustrates one example of an abnormality assessment process of the fuel cell system according to a modification example 4 of the second embodiment of the present disclosure.

Next, an operation method of the fuel cell system 100 according to the modification example 4 of the second embodiment will be described with reference to FIG. 9. FIG. 9 is a flowchart that illustrates one example of an abnormality assessment process of the fuel cell system 100 according to the modification example 4 of the second embodiment of the present disclosure. The fuel cell system 100 according to the modification example 4 of the second embodiment is different compared to the fuel cell system 100 according to the second embodiment in a point that the fuel cell system 100 performs the abnormality assessment process for the pressurizer 10 in a timing in execution of the purge action by discharging the anode off-gas that flows through the recycling path 7 in the operation of the fuel cell system 100 or a timing in prescribed time after the purge action or both of a timing in execution of the purge action and a timing in the prescribed time after the purge action. However, the fuel cell system 100 according to the modification example 4 performs a similar process to the fuel cell system 100 according to the second embodiment except for a point that the timing for performing the abnormality assessment process is limited.

That is, the controller 4 first assesses whether or not the timing is a timing in execution of the purge action by discharging the anode off-gas that flows through the recycling path 7 in the operation of the fuel cell system 100 and/or a timing in the prescribed time after the purge action (step S501). Here, when the controller 4 assesses that the timing is a timing in execution of the purge action in the fuel cell system 100 and/or a timing in the prescribed time after the purge action ("Yes" in step S501), the controller 4 inputs a prescribed input value Vc to the pressurizer 10 (step S502). On the other hand, when the controller 4 assesses that the timing is not a timing in execution of the purge action in the fuel cell system 100 and/or a timing in the prescribed time after the purge action ("No" in step S501), the controller 4 repeats the assessment in step S501 again.

A subsequent process to this (a process of step S503 to step S507) is similar to the process of step S102 to step S106 of the abnormality assessment process illustrated in FIG. 3, and a description will thus not be made.

In such a manner, in execution of the purge action in the operation of the fuel cell system 100 and/or in the prescribed time after the purge action, the fuel gas in measurement of the first pressure value P1 may be made single composition (hydrogen) even while the fuel cell system 100 is acting. Thus, the relationship between a prescribed input value Vc and the second pressure value P2 may be obtained regardless of the time change in the composition of the anode off-gas. Thus, the relation formula between the input value Vc and the second pressure value P2 may be simplified, errors in the relationship between the input value Vc and the second pressure value P2 due to the difference in the gas composition may be lessened, and the abnormality assessment for the pressurizer 10 may thereby be performed precisely.

Note that a timing in the prescribed time after the purge action, which is mentioned here, is a period after the purge action and before the next purge action is started, for example, and is a timing within a period in which the precision of the abnormality assessment for the pressurizer 10 is equivalent to a timing in the purge action (for example, within a period in which the hydrogen concentration in the anode off-gas does not become less than 95%).

Modification Example 5

Note that a configuration of the fuel cell system 100 according to a modification example 5 according to the second embodiment is a similar configuration to the fuel cell system 100 according to the second embodiment. Thus, a description about a device configuration will not be made.

[Abnormality Assessment Process for Pressurizer]

Figure 10:
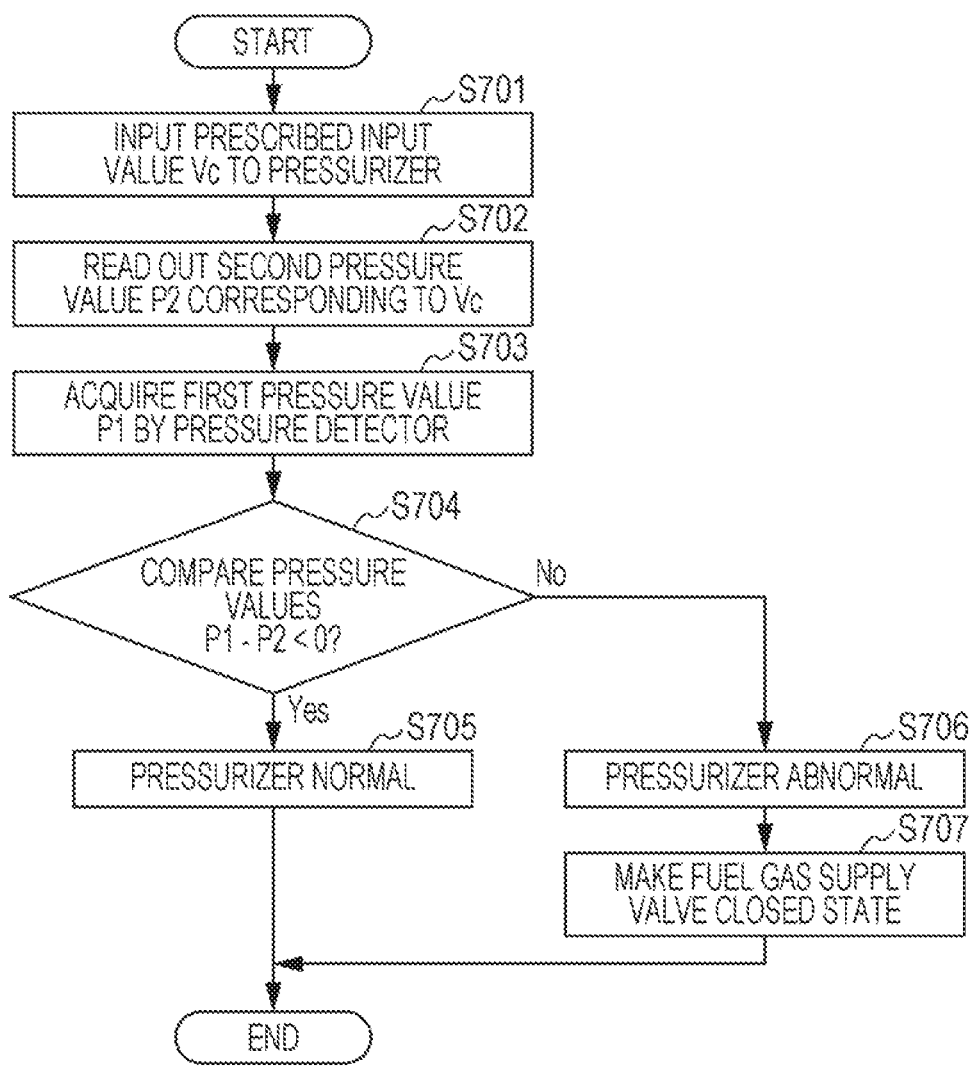
FIG. 10 is a flowchart that illustrates one example of an abnormality assessment process of the fuel cell system according to a modification example 5 of the second embodiment of the present disclosure.

Next, an operation method of the fuel cell system 100 according to the modification example 5 of the second embodiment will be described with reference to FIG. 10. FIG. 10 is a flowchart that illustrates one example of an abnormality assessment process of the fuel cell system 100 according to the modification example 5 of the second embodiment of the present disclosure. The fuel cell system 100 according to the modification example 5 of the second embodiment is different compared to the fuel cell system 100 according to the second embodiment in a point that when the controller 4 assesses that the pressurizer 10 is abnormal, the supply of the fuel gas is stopped by making the fuel gas supply valve a closed state. However, as for the other process than that, the fuel cell system 100 according to the modification example 5 performs a similar process to the fuel cell system 100 according to the second embodiment.

That is, a process of step S701 to step S706 of the abnormality assessment process illustrated in FIG. 10 is similar to the process of step S101 to step S106 of the abnormality assessment process illustrated in FIG. 3, and a description will thus not be made. When the pressurizer 10 is assessed as abnormal in step S706, the controller 4 performs control so as to make the fuel gas supply valve 13 the closed state and to stop the supply of the fuel gas from the fuel gas supply path 2 to the fuel cell 1 (step S707).

In such a manner, after the pressurizer 10 is assessed as abnormal, the fuel gas supply valve 13 is made the closed state, the fuel gas is thereby not supplied to the fuel cell 1, and the fuel cell system 100 may thus be stopped safely.

Modification Example 6

[Device Configuration]

Figure 11:
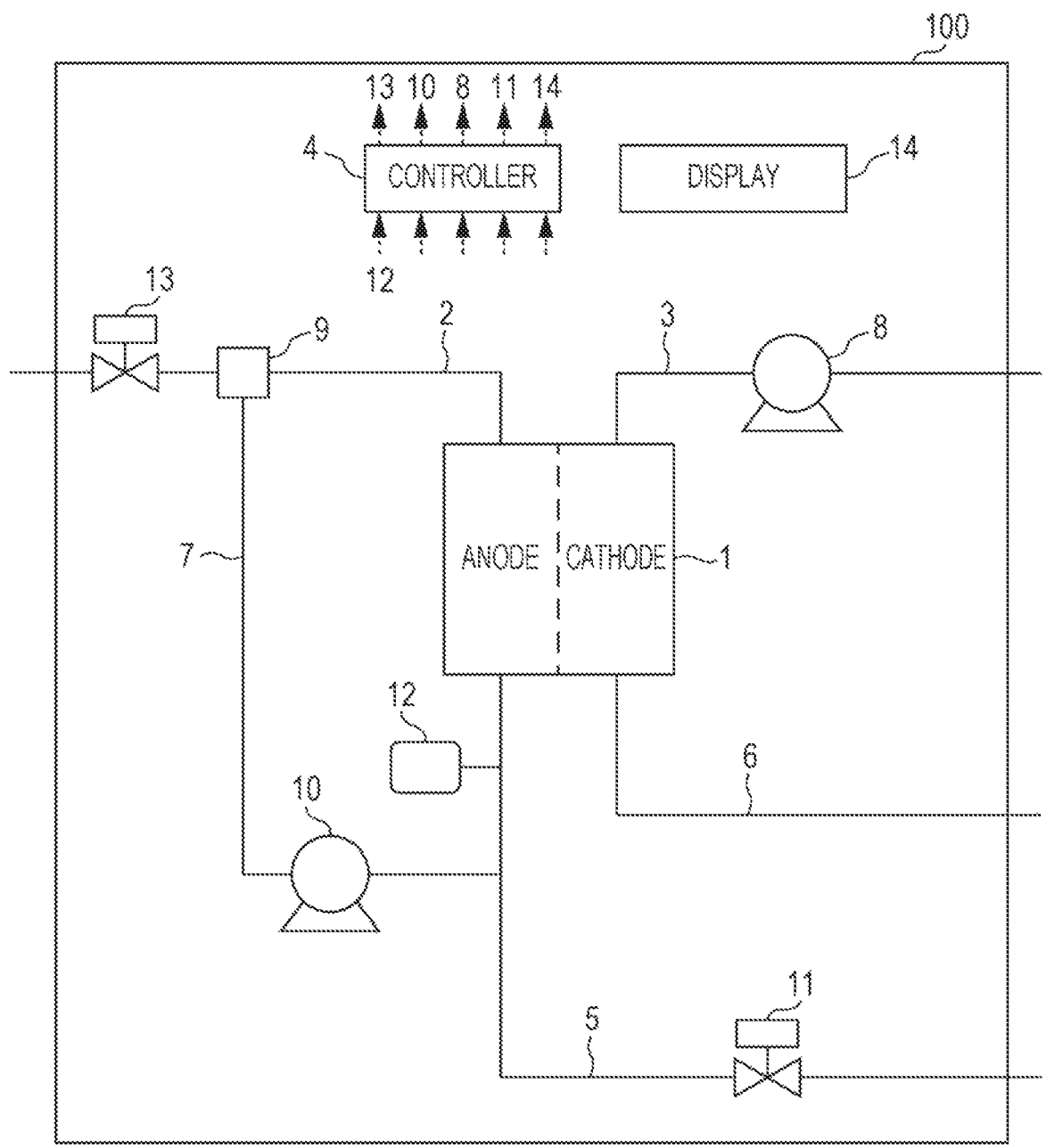
FIG. 11 is a diagram that schematically illustrates one example of a configuration of principal components of a fuel cell system according to a modification example 6 of the second embodiment of the present disclosure.

A configuration of the fuel cell system 100 according to a modification example 6 of the second embodiment will be described with reference to FIG. 11. FIG. 11 is a diagram that schematically illustrates one example of a configuration of principal components of the fuel cell system 100 according to the modification example 6 of the second embodiment of the present disclosure.

As illustrated in FIG. 11, the fuel cell system 100 according to the modification example 6 of the second embodiment is different in a point that a display 14 is further included, in the configuration of the fuel cell system 100 according to the second embodiment. The other configuration than that is the same as the fuel cell system 100 of the second embodiment, and a description will thus not be made.

The display 14 is a display device that displays an assessment result when the assessment is made that the pressurizer 10 is abnormal in the abnormality assessment process for the pressurizer 10. The display 14 may be any display device that may display that abnormality occurs to the pressurizer 10 and may be a liquid crystal display or a seven-segment display, for example.

[Abnormality Assessment Process for Pressurizer]

Figure 12:
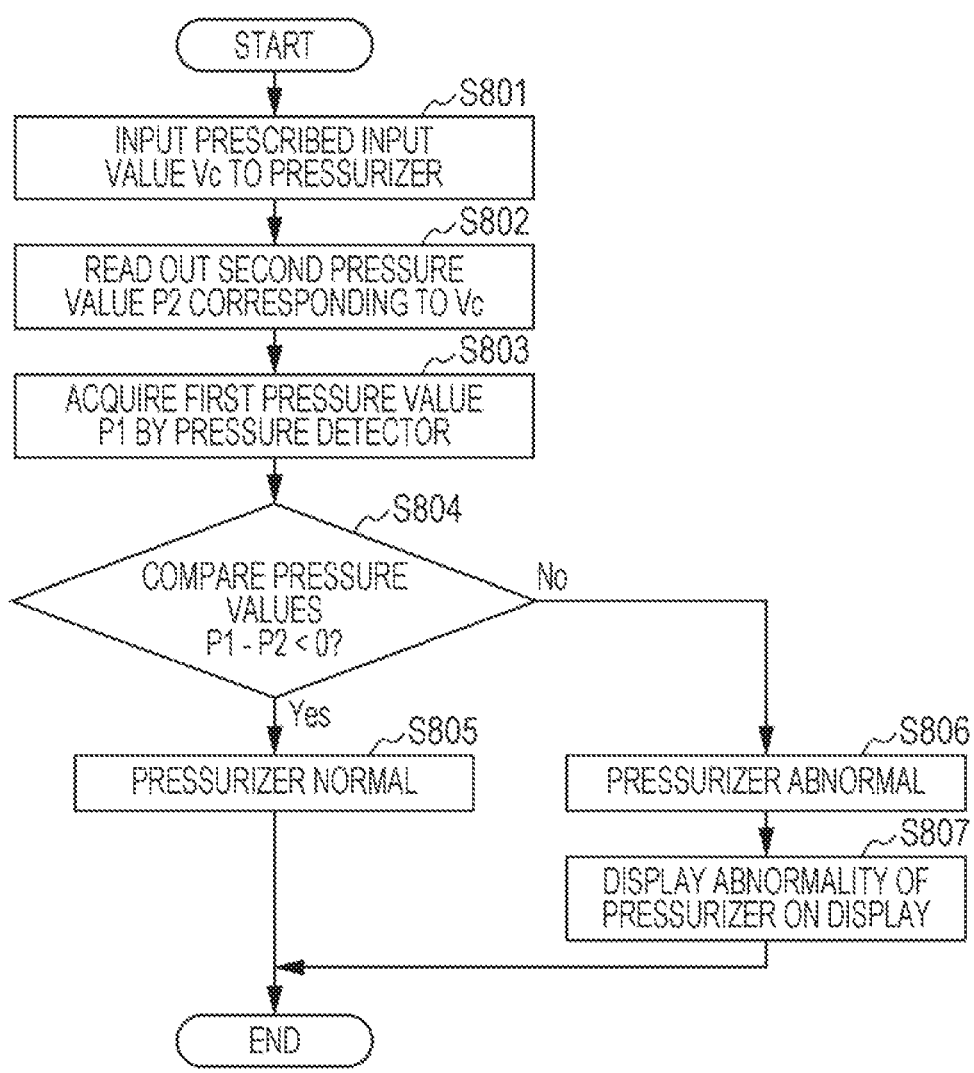
FIG. 12 is a flowchart that illustrates one example of an abnormality assessment process of the fuel cell system according to a modification example 6 of the second embodiment of the present disclosure.

Next, an operation method of the fuel cell system 100 according to a modification example 6 of the second embodiment will be described with reference to FIG. 12. FIG. 12 is a flowchart that illustrates one example of an abnormality assessment process of the fuel cell system 100 according to the modification example 6 of the second embodiment of the present disclosure. The fuel cell system 100 according to the modification example 6 of the second embodiment is different compared to the fuel cell system 100 according to the second embodiment in a point that when the controller 4 assesses that the pressurizer 10 is abnormal, the display 14 is caused to display information that indicates abnormality of the pressurizer 10. However, as for the other process than that, the fuel cell system 100 according to the modification example 6 performs a similar process to the fuel cell system 100 according to the second embodiment.

That is, a process of step S801 to step S806 of the abnormality assessment process illustrated in FIG. 12 is similar to the process of step S101 to step S106 of the abnormality assessment process illustrated in FIG. 3, and a description will thus not be made. When the pressurizer 10 is assessed as abnormal in step S806, the controller 4 controls the display 14 to display the information that indicates abnormality of the pressurizer 10 (step S807).

In such a manner, the display 14 displays the information that indicates abnormality of the pressurizer 10, it thereby becomes visually clear that a cause of stop of the operation in the fuel cell system 100 is abnormality of the pressurizer 10, and restoration work from the stop of the operation of the fuel cell system 100 may quickly be performed.

Note that the fuel cell system 100 according to the modification example 6 has a configuration in which abnormality of the pressurizer 10 is displayed by the display 14 and is notified to an operator or the like. However, a configuration for notifying an operator or the like is not limited to this. For example, a configuration is possible in which a light emitting unit is included instead of the display 14 and abnormality is notified by a light emitting state of the light emitting unit. Further, a configuration is possible in which a sound output device is included instead of the display 14 and abnormality is notified by the sound output device. Furthermore, a configuration is possible in which a printer is included instead of the display 14 and abnormality is notified by printing. That is, it is sufficient that an output device may output information that indicates abnormality of the pressurizer 10.

Note that the first and second embodiments and the modification examples 1 to 6 may be combined with each other unless those exclude each other. Many alterations and other embodiments of the present disclosure may become clear for a person having ordinary skill in the art from the above descriptions. Therefore, the above descriptions are to be construed as only examples and are provided for the purpose of teaching best modes for carrying out the present disclosure to a person having ordinary skill in the art. Details of structures and/or functions may substantially be changed without departing from the spirit of the present disclosure.

A fuel cell system of the present disclosure is useful as a fuel cell system that may appropriately assess abnormality of a pressurizer for sending out anode off-gas which flows through a recycling path to a fuel gas supply path in a configuration in which anode off-gas is returned to the fuel gas supply path via the recycling path.

What is claimed is:

1. A fuel cell system comprising:
   a fuel cell configured to generate power by using a fuel gas and an oxidant gas;
   a fuel gas supply path configured to supply the fuel gas to an anode entrance of the fuel cell;
   a recycling path configured to return anode off-gas which is discharged from an anode exit of the fuel cell to an entrance of the fuel cell;
   an anode off-gas discharge path that branches from the recycling path and is configured to discharge the anode off-gas to an outside;
   a first valve that is provided in the anode off-gas discharge path;
   a pressurizer that is provided in the recycling path and configured to pressurize the anode off-gas which flows through the recycling path to thereby flow the anode off-gas into the fuel gas supply path; and
   a controller programmed to control that controls the pressurizer to act in at least one of a timing in execution of a purge action in which the fuel gas is supplied from the fuel gas supply path and the anode off-gas is discharged to the outside in a state where the first valve is opened and a timing in prescribed time after the purge action and programmed to assess abnormality, while the control is executed, based on a pressure of the anode off-gas that flows through the recycling path or the anode off-gas discharge path, or an action amount of the pressurizer.

2. The fuel cell system according to claim 1, wherein the controller programmed to assess that abnormality is present when the pressure of the anode off-gas that flows through the recycling path that is upstream of the pressurizer or the pressure of the anode off-gas that flows through the anode off-gas discharge path is a first threshold value or more.

3. The fuel cell system according to claim 1, wherein the controller programmed to assess that abnormality is present when the pressure of the recycling path that is upstream of the pressurizer or the pressure of the anode off-gas discharge path is a second threshold value or less.

4. The fuel cell system according to claim 1, wherein the controller programmed to assess the abnormality at a start of the fuel cell.

5. The fuel cell system according to claim 2, further comprising:
   a second valve that is provided in the fuel gas supply path, wherein
      when an assessment is made that the abnormality is present, the controller is configured to stop supplying of the fuel gas from the fuel gas supply path by closing the second valve.

6. The fuel cell system according to claim 1, further comprising:
   an output device that outputs information which indicates the abnormality when the controller assesses that the abnormality is present.

* * * * *